United States Patent [19]
Burgess et al.

[11] Patent Number: 5,696,701
[45] Date of Patent: Dec. 9, 1997

[54] METHOD AND SYSTEM FOR MONITORING THE PERFORMANCE OF COMPUTERS IN COMPUTER NETWORKS USING MODULAR EXTENSIONS

[75] Inventors: Gregory M. Burgess, Kirkland, Wash.; David B. Endicott, Plano, Tex.; Thomas Camarro, Troy; Richard C. Jagers, Novi, both of Mich.

[73] Assignee: Electronic Data Systems Corporation, Plano, Tex.

[21] Appl. No.: 678,800

[22] Filed: Jul. 12, 1996

[51] Int. Cl.⁶ ............................................. G06F 11/00
[52] U.S. Cl. ............... 364/551.01; 364/570; 364/550; 395/183.01; 395/183.02; 395/650; 395/200.01
[58] Field of Search ................ 364/551.01, 284.4, 364/264.5, 280, 265, 242.95, 264, 550, 514 B, 570; 395/650, 184.01, 500, 200.09, 200.01, 200.12, 200.03, 183.01, 183.02

[56] References Cited

U.S. PATENT DOCUMENTS

| | | | |
|---|---|---|---|
| 4,780,821 | 10/1988 | Crossley | 364/200 |
| 4,949,248 | 8/1990 | Caro | 364/200 |
| 5,062,104 | 10/1991 | Lubarsky et al. | 370/60 |
| 5,202,989 | 4/1993 | Hirosawa et al. | 395/650 |
| 5,303,166 | 4/1994 | Amalfitano et al. | 364/551.01 |
| 5,367,670 | 11/1994 | Ward et al. | 395/575 |
| 5,402,431 | 3/1995 | Saadeh et al. | 371/67.1 |
| 5,459,837 | 10/1995 | Caccavale | 395/184.01 |
| 5,506,955 | 4/1996 | Chen et al. | 395/183.02 |
| 5,548,724 | 8/1996 | Akizawa et al. | 395/650 |
| 5,557,749 | 9/1996 | Norris | 395/200.18 |
| 5,581,482 | 12/1996 | Wiedenman et al. | 364/551.01 |
| 5,630,049 | 5/1997 | Cardoza et al. | 395/183.01 |

OTHER PUBLICATIONS

"Chapter 2 Zen and the Art of Performance Monitoring" from Optimizing Windows NT by Russ Blake, Copyright 1995, pp. 1 through 47 plus cover pages.

"Chapter 12 Writing a CustomWindows NT Performance Monitor" from Optimizing Windows NT by Russ Blake, Copyright 1995, pp. 1 through 14 plus cover pages.

"2.6.8 Performance Monitoring Service" from Optimizing Windows NT by Russ Blake, Copyright 1995, p. 1 plus cover pages.

"8.1 Performance Monitoring Service" from Optimizing Windows NT by Russ Blake, Copyright 1995, pp. 1 through 2 plus cover pages.

*Primary Examiner*—Emanuel T. Voeltz
*Assistant Examiner*—Bryan Bui
*Attorney, Agent, or Firm*—L. Joy Griebenow

[57] ABSTRACT

The invention comprises a method and system for monitoring the performance of a computer in a computer network using modular extension agents. In accordance with the method of the invention the first computer repeatedly obtains performance data including at least one performance value comprising a measure of the performance of the computer. The performance data is automatically sent over the computer network through a second computer coupled to the computer network. The second computer receives the performance data and passes the performance data to a first extension agent, wherein the first extension agent is operable to process the performance data.

20 Claims, 5 Drawing Sheets

METHOD AND SYSTEM FOR MONITORING THE PERFORMANCE OF COMPUTERS IN COMPUTER NETWORKS USING MODULAR EXTENSIONS

CROSS-REFERENCE TO RELATED APPLICATIONS

This application is related to U.S. application Ser. No. 08/678,934, filed on Jul. 12, 1996 by Gregory M. Burgess, et al. and entitled "Method and System for Performance Monitoring in Computer Networks," pending.

This application is related to U.S. application Ser. No. 08/679,293, filed on Jul. 12, 1996 by Gregory M. Burgess, et al. and entitled "Method and System for Tracking the Configuration of a Computer Coupled to a Computer Network," pending.

These applications have been commonly assigned to Electronic Data Systems Corporation.

TECHNICAL FIELD OF THE INVENTION

This invention relates generally to performance monitoring in computer networks and more particularly to a method and system for monitoring the performance of a computer in a computer network using modular extensions.

BACKGROUND OF THE INVENTION

The use of computer networks connecting a number of computers has been increasing. Often, computer networks are connected in a client server relationship. One or more server computers normally contain resources that are shared among a number of client computers. Shared resources can also be stored on client computers.

Because a server is a shared resource, the capabilities that the server needs to possess to adequately serve the client computers vary depending upon the number of users of the shared resources. As the number of client computers grows, demands on a server will often increase. The capabilities of the server may affect the amount of time it takes for a client to access a shared resource on a server. If the server does not have sufficiently high performance characteristics, clients may incur greater delays in waiting to access shared resources. Network planners thus take server performance into account when designing a network and when upgrading a network.

Depending upon the configuration of a network, the types of tasks ordinarily performed by users of the network, usage patterns that may develop over the course of a workday, and other such variables, the performance level desired for a particular server in a particular computer network may vary considerably. One way to determine the performance desired for a particular server in a particular network is to study the performance of existing servers on that network over time. By gathering performance statistics, network planners can better determine the performance level desirable for upgrades either to specific servers or to the network as a whole such as by adding additional servers.

Network planners will normally use some type of performance monitoring software to aid in the task of monitoring computer performance. Unfortunately, existing performance monitoring software normally requires human intervention. A network planner often must be either physically present at the computer whose performance he desires to monitor or logged onto that computer from a remote location. Thus, performance monitoring may be time consuming because a network operator will normally need to be physically present when using performance monitoring software. In a large network, a network operator might spend a day or several days simply obtaining a small amount of performance data from each server in the network.

Existing performance monitoring software normally has a number of built-in functions. Adding additional functions desired by a particular network operator may be difficult and expensive. Existing programs that require network operator intervention are also not useful in detecting server performance that has become so critical that the server may fail or that the entire network may fail. This performance data might only be obtained if the network operator happens to be monitoring the performance of the particular server at the time when its performance becomes critical. Existing performance monitoring software, therefore, is mostly unhelpful in predicting either server or network failure.

Finally, existing performance monitoring programs do not allow easy tracking of the configuration of computers in the network.

SUMMARY OF THE INVENTION

The invention comprises a method and system for monitoring the performance of a computer coupled to a computer network. The invention employs a novel architecture including modular program extensions to allow flexible upgrades to the invention's performance monitoring capability. One aspect of the invention is a method for monitoring the performance of a first computer coupled to a computer network. Performance data is repeatedly obtained using the first computer and comprises at least one performance value which is a measure of the performance of the first computer. The performance data is automatically sent over the computer network to a second computer coupled to the computer network. The performance data is received at the second computer and then passed to a first extension agent wherein the first extension agent is operable to process the performance data.

The invention has several important technical advantages. The invention allows simultaneous performance monitoring of a number of computers, typically server computers, connected to a computer network. The performance data is sent to a central listener application which allows the performance data to be easily logged for future reference by a network administrator. The modular extension agent architecture of the invention allows the performance monitoring capabilities of the central listener application to be easily upgraded to include additional capabilities. Also, because the central listener application is modular, different embodiments of the invention with different capabilities may be sold as different products to different customers. In addition, in certain networks, the network administrator may only desire to provide some of the possible performance monitoring capabilities associated with the invention. The modularity of the central listener application allows a network administrator to choose which performance monitoring capabilities to provide at particular locations.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1–10 of the drawings, like numerals being used for like and corresponding parts of the various drawings.

Figure 1:
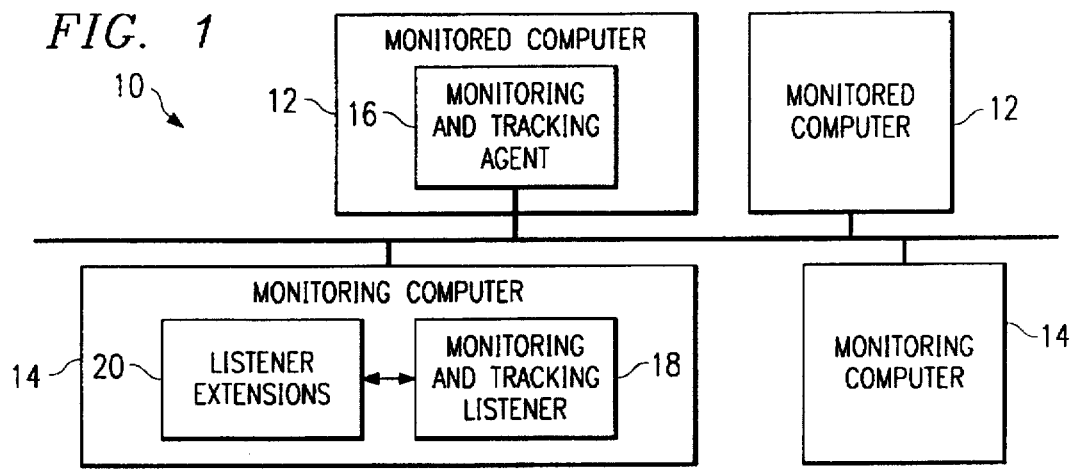
FIG. 1 illustrates a computer network using the method and system of the present invention.

FIG. 1 illustrates a computer network 10 that employs the performance monitoring method and system of the present invention. Computer network 10 comprises a plurality of monitored computers 12 networked to a number of monitoring computers 14. Although this embodiment has two monitored computers 12 and two monitoring computers 14, other embodiments of the invention may have either a different number of monitored computers 12 or monitoring computers 14. Ordinarily, the monitored computers 12 will be server computers but could be any type of computer. Computer network 10 may comprise any type of computer network such as a local area network or wide area network.

Monitoring and tracking agent 16, which comprises a program that is run by monitored computer 12, monitors the performance of monitored computer 12. Monitoring and tracking agent 16 sends performance data to monitoring and tracking listener 18, which is a program running on monitoring computer 14. Monitoring and tracking listener 18 may, in turn, forward the data obtained from monitoring and tracking agent 16 to one or more listener extensions 20, which comprise programs running on monitoring computer 14.

Although the structure and operation of monitoring and tracking agent 16 and monitoring and tracking listener 18 will be described in more detail below, a brief overview of the operation of each will now be given. Monitoring and tracking agent 16 will normally run as an operating system service on monitored computer 12. In this embodiment, monitoring and tracking agent 16 is a WINDOWS NT service. Monitoring and tracking agent 16 may perform several functions related to performance monitoring of monitored computer 12. Monitoring and tracking agent 16 monitors .the performance of monitored computer 12 over time and captures performance data reflecting one or more aspects of the performance of monitored computer 12. At preset intervals, it stores the data in a log file and notifies monitoring and tracking listener 18 that it has new data.

When monitoring and tracking listener 18 is ready to gather the performance data, it retrieves previously ungathered performance data from monitoring and tracking agent 16.

Monitoring and tracking agent 16 also generates alerts if one or more aspects of the performance of monitored computer 12 has reached a critical level. Monitoring and tracking agent 16 monitors the performance of monitored computer 12 at preset intervals and compares one or more performance parameters to preset thresholds. If the comparison to a threshold indicates that performance has become alertable, monitoring and tracking agent 16 generates an event which is sent to the local operating system event log of monitored computer 12 and sends a message to monitoring and tracking listener 18 with the information regarding the alert.

Monitoring and tracking agent 16 also monitors operating system events on monitored computer 12. Each time a new event is placed in the operating system event log (the WINDOWS NT event log in this embodiment), monitoring and tracking agent 16 processes the event. If the user of monitoring and tracking agent 16 has indicated that this type of event has a high enough priority to monitor directly, then monitoring and tracking agent 16 sends a message with the event information to monitoring and tracking listener 18. Low priority events are filtered out and ignored.

Monitoring and tracking agent 16 may also be used to monitor configuration changes for monitored computer 12. Each time that monitoring and tracking agent 16 is started, it analyzes the current system configuration of monitored computer 12 to determine whether any changes have been made since the prior time that monitoring and tracking agent 16 was started. If changes have been made, these changes are sent to monitoring and tracking listener 18 so that monitoring computer 14 may keep track of the most current configuration of monitored computer 12.

Monitoring and tracking listener 18 will normally be run as an operating system service on monitoring computer 14. In this embodiment, monitoring and tracking listener 18 comprises a WINDOWS NT service running on monitoring computer 14. Monitoring and tracking listener 18 receives messages and data from monitoring and tracking agent 16. Monitoring and tracking listener 18 also dispatches data and messages to one or more plug-in listener extensions 20. Listener extensions 20 may then direct some or all of the data to databases, a central console, or simple text files. Monitoring and tracking listener 18 could also perform some of these functions itself rather than handling these functions using listener extensions 20.

Figure 2:
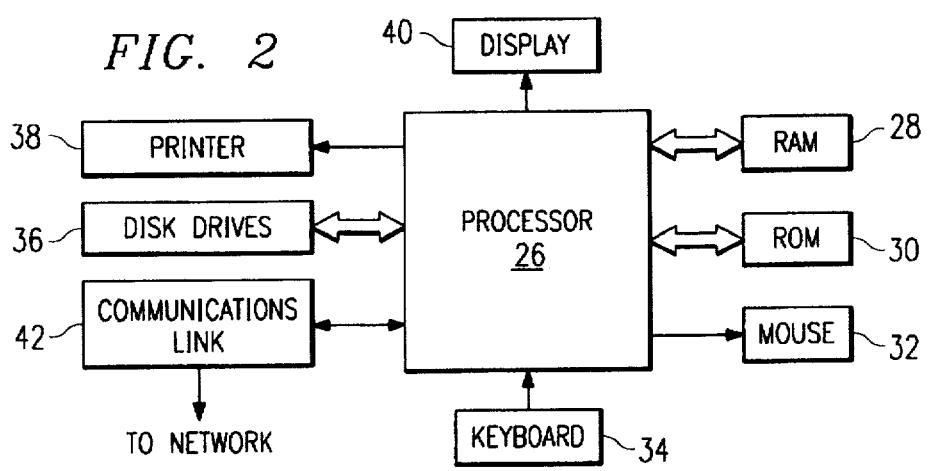
FIG. 2 illustrates a computer that may be used in the computer network of FIG. 1.

FIG. 2 illustrates a general purpose computer 24 that may be used for either monitored computer 12, monitoring computer 14, or both. Computer 24 may be adapted to execute any of the well known MSDOS, PCDOS, OS2, UNIX, MOTIF, MAC-OS, X-WINDOWS, and WINDOWS operating systems, or other operating systems. Computer 24 comprises processor 26, random access memory (RAM) 28, read only memory (ROM), 30, mouse, 32, keyboard 34 and input/output devices such as printer 38, disk drives 36, display 40 and communications link 42. The present invention includes computer software that may be stored in RAM 28, ROM 30, or disk drives 36 and is executed by processor 26. Communications link 42 is connected to computer network 10, but could also be connected to a telephone line, an antenna, a gateway, or any other type of communications link. Disk drives 36 may include a variety of types of storage media such as, for example, floppy disk drives, hard disk drives, CD-ROM drives, or magnetic tape drives.

Figure 3:
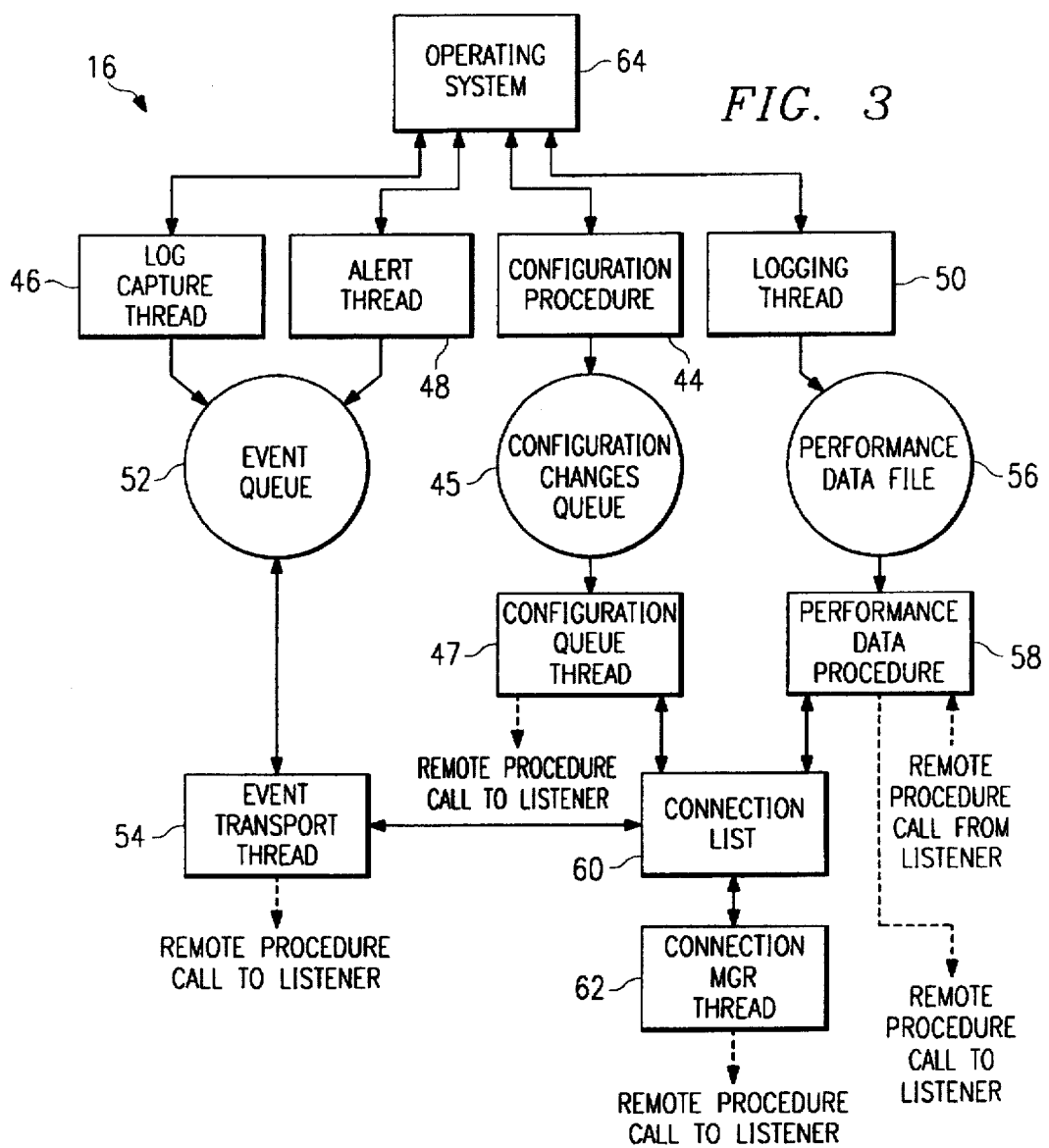
FIG. 3 illustrates a block diagram of a monitoring and tracking agent constructed in accordance with the teachings of the invention.

FIG. 3 illustrates a block diagram of an embodiment of monitoring and tracking agent 16 constructed in accordance with the invention. Monitoring and tracking agent 16 is preferably a multi-threaded application that can efficiently process performance data. The structure of monitoring and tracking agent 16 illustrated in FIG. 3 is only one of many possible structures and other structures could be used to perform the functions of the invention. In addition, monitoring and tracking agent 16 need not be a multi-threaded application.

Monitoring and tracking agent 16 comprises configuration procedure 44, log capture thread 46, alert thread 48, logging thread 50, event transport thread 54, configuration queue thread 47, performance data procedure 58 and connection manager thread 62. Monitoring and tracking agent 16 communicates with operating system 64. Operating system 64 comprises the operating system for monitored computer 12. In addition, monitoring and tracking agent 16 maintains event queue 52, performance data file 56, and connection list 60. Although the operation of monitoring and tracking agent 16 will be more fully described in connection with FIGS. 5–8 below, a description of the operation of each component is now provided.

Configuration procedure 44 is invoked by a main thread (not explicitly shown), which handles initialization as well as configuration change reporting. When monitoring and tracking agent 16 is started, configuration procedure 44 gathers system configuration information such as information about the operating system, hardware, software, memory, logical disks, system environment, services and drivers, and install devices of monitored computer 12. This information can be used to track configuration changes such as software updates and hardware upgrades for monitored computer 12. Configuration procedure 44 also starts configuration queue thread 47. Configuration procedure 44 obtains the configuration information from operating system 64. In this embodiment, configuration procedure 44 obtains the configuration information from the WINDOWS NT registry file maintained by operating system 64. Configuration procedure 44 compares the obtained configuration information with prior configuration information that configuration procedure 44 maintains in a file (not explicitly shown). If the configuration information is unchanged, configuration procedure 44 simply terminates. If the configuration information has changed, configuration procedure 44 generates a message for monitoring and tracking listener 18 containing the configuration information. Configuration procedure 44 places this message in configuration changes queue 45. Configuration queue thread 47 reads configuration changes out of configuration changes queue 45 and sends to listeners appearing on connection list 60 as described below.

Examples of configuration information that may be obtained by configuration procedure 44 regarding the operating system include the date of installation, the registered owner, the registered organization, the current version, the system root directory, the current version of operating system, the product type, the build number of the operating system, and various start-up options of the operating system. Examples of configuration information that configuration procedure 44 may obtain regarding the hardware include the OEM ID, the system BIOS date, the page file size for virtual memory, the minimum application address, the maximum application address, the processor type, and number of processors. Examples of configuration information that configuration procedure 44 may obtain regarding the memory include the current load, the total physical memory, the available physical memory, the total page file, the available page file, the total virtual memory size, and the available virtual memory size. Configuration procedure 44 may also obtain configuration information regarding the services and drivers available on the system. Examples of the configuration information about each service or driver include the name of the service or driver, its status, the service type, the start-up configuration, the full path name of the executable image, the file size, the file date, the version number, the location of the raw version, and the location of the ASCII version.

Log capture thread 46 is used to monitor events occurring on monitored computer 12. Log capture thread 46 processes each event received by an event log associated with operating system 64. In this embodiment, the event log is the WINDOWS NT event log. Log capture thread 46 monitors the event log for new events. If a new event is posted to the event log, log capture thread 46 will process that event.

Log capture thread 46 provides a filtering feature when processing events. If an event is filtered out, log capture thread 46 ignores that event. If an event was not filtered out, then log capture thread 46 generates a message indicating that an event has occurred, wherein the message includes data about the event. Log capture thread 46 places the message in event queue 52. The message will eventually be forwarded to monitoring and tracking listener 18.

In this embodiment, operating system 64 has multiple event logs that are monitored by log capture thread 46. Each event log obtains events from specific sources in monitored computer 12. Each event also is associated with an event identification number identifying particular events. Log capture thread 46 may filter events based upon the event log in which they appear, the source of the event, and/or the event identification number. Filters can include or exclude specific event identification numbers, event sources, or event logs. Filtering is hierarchical in this embodiment: event identification first, event source second, and event log last. A flag may be used to indicate whether to include or exclude events with a specific identification number, source, or event log.

Alert thread 48 monitors various performance counters reflecting the performance of monitored computer 12, calculates performance values for those counters and compares those values to predetermined thresholds. If the comparison indicates that the performance of monitored computer 12 has reached an alertable level, then alert thread 48 generates an alert. Alerts generated by alert thread 48 comprise a message identifying the message as an alert and including data about the alert. Alert thread 48 places such alert messages in event queue 52.

Alert thread 48 obtains performance information about monitored computer 12 using counters maintained by operating system 64. Each counter reflects one aspect of the performance of monitored computer 12. In this embodiment, the counters comprise WINDOWS NT performance counters maintained by the WINDOWS NT operating system. Alert thread 48 monitors these counters at an adjustable time interval which is determined by the user of monitoring and tracking agent 16. After the passage of each interval of time, alert thread 48 captures the values of the performance counters, calculates performance values based upon the counters, and compares the performance values to predetermined threshold values determined by the user of monitoring and tracking agent 16. A performance value might be the value of a performance counter itself. The user of monitoring and tracking agent 16 may associate various levels of performance of a particular performance value with different levels of alerts such as harmless, medium severity, or critical. The transmission of an alert indicates that the performance of monitored computer 12 has reached an alertable level.

Alert thread 48 may monitor many different performance counters. For example, alert thread 48 may monitor the percentage of free space remaining on each logical disk associated with monitored computer 12. In this embodiment, an alert is generated when the percentage of free space is less than five percent. This alert provides a warning that a work station or server logical drive is becoming full and could prevent users from saving data and/or cause performance degradation.

In this embodiment, alert thread 48 also monitors the percentage of time that a processor is busy executing a non-idle thread. This performance data could be viewed as a measure of the percentage of time that the processor of monitored computer 12 spends doing useful work. Each processor of monitored computer 12 is assigned an idle thread in the idle process which consumes unused processor cycles. This alert may identify sustained high processor utilization which may indicate that a process is running improperly or that the processor is approaching capacity. In this embodiment, an alert is generated if the percentage of time that a processor is busy executing a non-idle thread exceeds 85 percent.

Alert thread 48, in this embodiment, also monitors the rate at which the operating system switches between threads. Thread switches can occur either inside a single process or across multiple processes. A thread switch is caused either by another thread requesting processor time or by a higher priority thread preempting the current thread. Excessive context switches between threads may indicate that the operating system of monitored computer 12 is overburdened or causing performance degradation. In this embodiment, an alert is generated if the number of context switches per second exceeds 2,000.

Alert thread 48, in this embodiment, also monitors the percentage of free space available in each paging file. As the percentage of free space decreases, this performance value may indicate that the operating system is approaching the limits of its virtual memory. If the paging files are full, the operating system of monitored computer 12 may halt. Monitoring of this performance value may allow a command to monitored computer 12 to increase the size of its paging file to accommodate the operating system demands. In this embodiment, if the paging files are over 80 percent full, an alert is generated.

Alert thread 48 also monitors the amount of physical memory available to the operating system. If a process running on monitored computer 12 requires more RAM than is available, the operating system must swap another process out to the paging files to free memory, which may slow system performance. As the availability of physical memory shrinks, the operating system must swap more processes in and out of memory and performance may degrade. Monitoring of this performance data may allow a message to be sent to monitored computer 12 to cease executing extraneous processes. In this embodiment, an alert is generated if the available physical memory falls below one megabyte.

Alert thread 48 also monitors the number of times that the operating system is not able to assign a work item to service a request. If a process is not assigned a work item, it will not be serviced by the operating system and must wait before proceeding. Monitoring of this performance data may allow a message to be sent to monitored computer 12 to tune the operating system to provide more work items to service requests. In this embodiment, if the number of work item shortages is greater than 30, an alert is generated.

Alert thread 48 also monitors the number of times an internal server error was detected. Under normal circumstances server errors should not occur. Unexpected errors usually indicate a problem with the operating system and can result in an operating system halt. Monitoring of this performance information may allow a network administrator to take action before the halt of the operating system of monitored computer 12. In this embodiment if the number of system errors exceeds ten, then an alert is generated.

Logging thread 50 handles logging of performance data. Logging thread 50 logs performance data each predetermined time interval. The predetermined time interval may be set by the user of monitoring and tracking agent 16 and may or may not be the same as the interval over which alert thread 48 monitors performance for purposes of generating alerts. After the passage of the predetermined time interval, logging thread 50 obtains the values of performance counters from operating system 64. From this data, logging thread 50 may calculate performance values based upon the counters. Some of the counters may also comprise performance values without further calculation. Logging thread 50 stores the relevant performance data with a time stamp identification in performance data file 56. Performance data file 56 is a data file that may be stored on the disk drives 36 of monitored computer 12. After obtaining the performance data and storing it in performance data file 56, logging thread 50 causes data to be placed in connection list 60 indicating the date and time at which the performance data was captured. If this time and date is later than an existing entry, than the existing entry is maintained.

In this embodiment, logging thread 50 monitors a number of performance values. The user of monitoring and tracking agent 16 may choose which performance values to monitor and may disable the monitoring of others. In this example, performance values monitored by logging thread 50 include the available bytes of memory, the cache bytes available, the committed bytes, the number of page faults per second, the number of cache faults per second, the peak number of cache bytes, the number of pages per second, the size of the paged bytes pool, and the size of the non-paged bytes pool. Logging thread 50 also monitors performance data relating to the operating system of monitored computer 12. Examples of such performance values include the percentage of total operating system privilege time, the percentage of total processing time, the percentage of total user time, the number of context switches per second, the number of file control bytes per second, the number of file control operations per second, the number of file data operations per second, the number of file read bytes per second, the number of file read operations per second, the number of file write bytes per second, the number of file write operations per second, the number of system calls per second, the total number of interrupts per second, and the system up time.

Logging thread 50 also monitors performance data relating to the physical disks of monitored computer 12. Examples of performance values monitored by logging agent 50 include the percentage of time devoted to disk access, the percentage of time devoted to disk reads, and the percentage of time devoted to disk writes. Similar counters may be monitored for each logical disk and the percentage of free space on each logical disk may also be monitored. The percentage usage of the paging file may also be monitored by logging thread 50.

Several performance values may also be monitored which are known as server parameters. Logging thread 50 monitors the number of work item shortages, the number of server sessions, the number of pool non-paged failures, the number of pool paged failures, and the number of system errors. Other performance values may be monitored without departing from the scope of the invention.

Because performance data is considered lower priority than event, alert, and configuration data, the invention employs a mechanism such that monitoring and tracking listener 18 retrieves the performance data from performance data file 56 when it is not performing higher priority functions. In this embodiment, monitoring and tracking agent 16 and monitoring and tracking listener 18 work in a push-pull configuration wherein monitoring and tracking agent 16 notifies listener 18 that new performance data is available (push), and monitoring and tracking listener 18 retrieves the performance data when it has completed higher priority tasks (pull). If the agent has new performance data and the listener has not yet responded to a previous notification, the agent in this embodiment will not send another notification. In this embodiment, a date and time stamp is sent with each notification so subsequent notifications are not sent. Monitoring and tracking listener 18 collects all outstanding data when it responds to a request by collecting all data placed in performance data file 56 having a date and time stamp equal to or after the date and time stamp in the notification received from monitoring and tracking agent 16.

The notification by monitoring and tracking agent 16 that performance data is available is sent to monitoring and tracking listener 18 by making a remote procedure call to agent list procedure 70. Dispatcher thread 54 retrieves the message from event queue 52 and makes a remote procedure call over the network using a TCP/IP protocol to the agent list procedure of monitoring and tracking listener 18. When monitoring and tracking listener 18 desires to obtain the performance data from monitoring and tracking agent 16, it generates a remote procedure call of its own to performance data procedure 58 of monitoring and tracking agent 16. Performance data procedure 58 obtains the performance data from performance data file 56 and returns the data to monitoring and tracking listener 18. Performance data file 56 may be stored and/or sent over the network in compressed form.

Event queue 52 is a file that may be stored on a disk drive 36 of monitored computer 12. Event queue 52 obtains messages intended to be sent to monitoring and tracking listener 18. Event transport thread 54 handles the sending of messages in event queue 52 to the appropriate monitoring and tracking listener 18. Event queue 52 may comprise a single queue or a plurality of queues associated with the various threads of monitoring and tracking agent 16. Event transport thread 54 passes the messages to monitoring and tracking listener 18 by generating appropriate remote procedure calls over computer network 10 using a TCP/IP protocol.

The invention allows messages and data to be sent to one or more monitoring computers 14. A monitoring computer 14 may be classified as a primary or secondary site. In this embodiment, monitoring and tracking agent 16 sends all events, log data, and configuration data to a primary monitoring computer 14. Monitoring and tracking agent 16 will send events and configuration data to secondary monitoring computers 14 if a primary monitoring computer 14 is not available. In this embodiment, however, performance data that was logged using logging thread 50 is queued until the primary monitoring computer 14 is available.

The use of multiple monitoring computers 14 is accomplished using connection manager thread 62. Connection manager thread 62 maintains a list of all monitoring computers 14 to which monitoring and tracking agent 16 will report data. The list includes both primary and secondary monitoring computers 14. Connection manager thread 62 maintains the status of each monitoring computer 14 as being either on-line or off-line. The status of each monitoring computer 14 is stored in connection list 60. Connection list 60 comprises a file that may be stored on a disk drive 36 of monitored computer 12. Connection list 60 may also be stored in the RAM 28 of monitored computer 12.

Connection manager thread 62 determines whether a monitoring computer 14 is on-line or off-line by generating remote procedure calls to the monitoring and tracking listener 18 of that monitoring computer 14. If the appropriate response is received, then connection manager thread 62 records the status of that monitoring computer as being on-line. If no response is received, then connection manager thread 62 records the status of that monitoring computer 14 as being off-line.

When an event, alert, or configuration data is to be sent, event transport thread 54 consults connection list 60. If a primary site cannot be reached, event transport thread 54 will attempt to send the message and/or data to one or more secondary sites associated with that primary site. If at least one secondary site can be reached, then the message is sent to that secondary site. If a secondary site cannot be reached, then the message will remain in event queue 52 until a connection to either the primary or secondary monitoring computer 14 can be established. Note that multiple primary monitoring computers 14 may be designated for a particular monitoring and tracking agent 16. Thus, monitored computer 12 may report alerts to multiple locations. This feature of the invention is particularly useful in large computer networks where network administrators may be monitoring network performance at various locations.

When monitoring and tracking agent 16 has new performance data to send, it will consult connection list 60 only for the list of primary monitoring computers 14. If a particular primary monitoring computer 14 cannot be contacted, the notification will remain in connection list 60 until that particular primary monitoring computer 14 is available.

Figure 4:
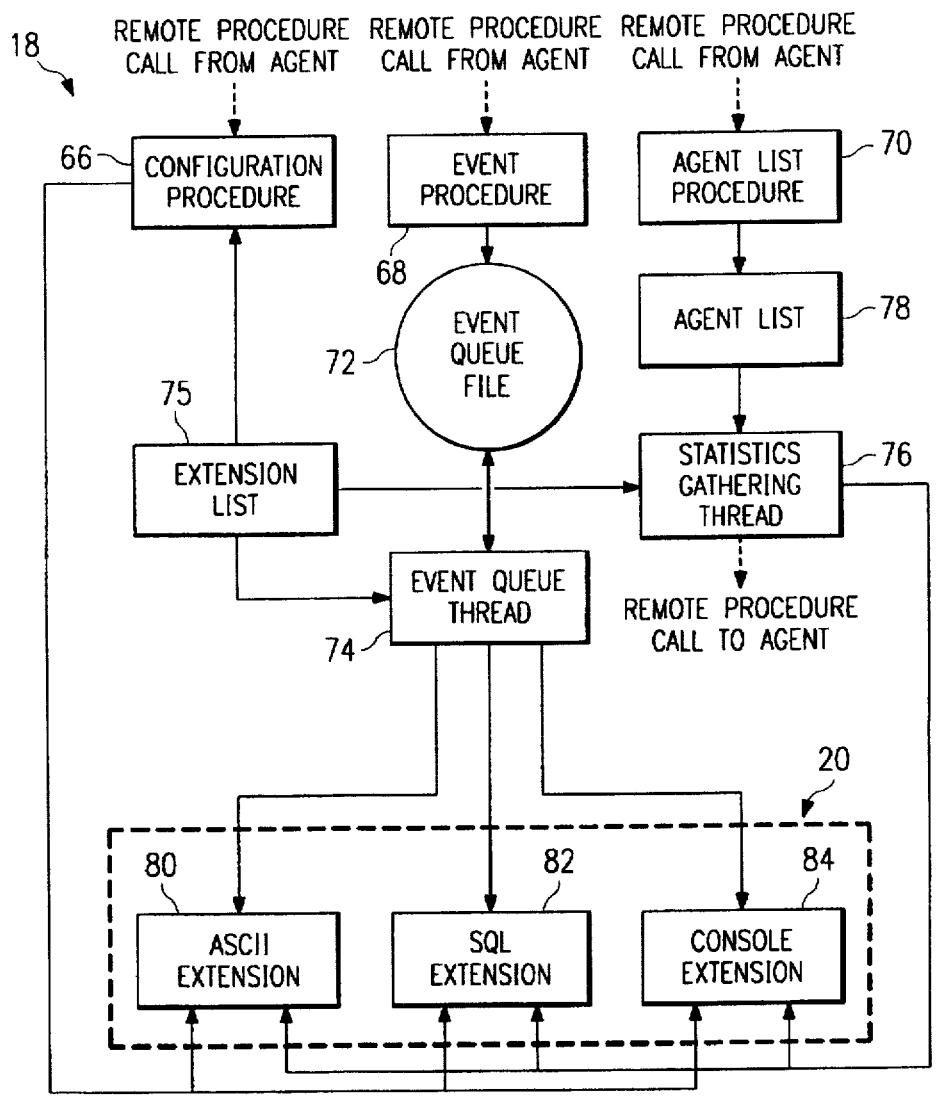
FIG. 4 illustrates a block diagram of a monitoring and tracking listener with listener extensions constructed in accordance with the teachings of the invention.

FIG. 4 illustrates an embodiment of monitoring and tracking listener 18 constructed in accordance with the invention. The structure of monitoring and tracking listener 18 is only one example of how monitoring and tracking listener 18 could be structured to perform the methods of the invention. In addition, monitoring and tracking listener 18 is a multi-threaded application but need not be a multi-threaded application.

Monitoring and tracking listener 18 comprises configuration procedure 66, event procedure 68, agent list procedure 70, statistics gathering thread 76, and event queue thread 74. In addition, monitoring and tracking listener 18 maintains extension agent event queue file 72, extension list 75, and agent list 78. Monitoring and tracking listener 18 also is coupled to one or more listener extensions 20. In this embodiment, monitoring and tracking listener 18 is coupled to ASCII extension agent 80, SQL database extension agent 82, and console extension agent 84. The operation of monitoring and tracking listener 18 is described in more detail in connection with FIGS. 9 and 10 below but the operation of components of monitoring and tracking listener 18 will now be partially described. Configuration procedure 66 receives remote procedure calls from one or more monitoring and tracking agents 16. Configuration procedure 66 receives remote procedure calls which are messages containing configuration data regarding the configuration of a monitored computer 12. Configuration procedure 66 processes the message and forwards the configuration data to each listener extension 20.

Event procedure 68 receives remote procedure calls from one or more monitoring and tracking agents 16 which are messages regarding events or alerts detected by monitoring and tracking agent 16. Event procedure 68 processes the events and alerts and forwards the data regarding each event or alert to event queue file 72. Agent list procedure 70 maintains a list of all monitored computers 12 for which the monitoring computer 14 running monitoring and tracking listener 18 is a primary monitoring computer 14. Agent list procedure 70 maintains the list as agent list 78 which may be stored in the RAM 28 of monitoring computer 14 or on a disk drive 36 of monitoring computer 14. Agent list 78 contains an indication as to whether each monitored computer 12 has performance data to be logged by monitoring and tracking listener 18 as well as a time stamp indicating the time and date of the oldest performance data obtained by that agent that has not been retrieved by monitoring and tracking listener 18.

Agent list procedure 70 receives notifications from monitoring and tracking agent 16 along with the time and date stamp associated with the notification indicating that a particular monitored computer 12 has performance data available to be logged. Agent list procedure 70 then updates agent list 78. When monitoring and tracking listener 18 is not busy (i.e. there are free processor cycles to service the statistics gathering thread), then statistics gathering thread 76 will obtain performance data for each agent in the agent list 78 that has a pending notification that performance data is available. Statistics gathering thread 76 will obtain the performance data by generating a remote procedure call to performance data procedure 58 of monitoring and tracking agent 16. Statistics gathering thread 76 will obtain all performance data that has been logged by the corresponding monitoring and tracking agent 16 since the time and date stamp associated with that agent in agent list 78. After statistics gathering thread 76 has obtained the performance data, it passes each instance of the performance data to each of the listener extensions 20.

Event queue thread 74 dispatches the messages and data received by monitoring and tracking listener 18 to one or more listener extensions 20 coupled to monitoring and tracking listener 18. Event queue thread obtains a list of extensions from extension list 75. Extension list 75 keeps a dynamic list of available listener extensions 20 and event queue thread 74, statistics gathering thread 76, and configuration procedure 66 all send data to the extensions on the list. In this embodiment, listener extensions 20 comprise dynamic link library procedures. This feature of the invention allows monitoring and tracking listener 18 to be modularized. When a network administrator desires additional functionality to process data received by monitoring and tracking listener 18, the network administrator can simply create another listener extension 20 and cause the data received by monitoring and tracking listener 18 to be sent to that listener extension. In this embodiment, event queue thread 74 dispatches data and messages in event queue file 72 to each of the listener extensions 20.

ASCII extension agent 80 comprises a procedure that takes the data obtained from event queue thread 74, statistics gathering thread 76, and configuration procedure 66 and writes the data to a text file. The text file may be stored on the disk drive 36 of monitoring computer 14 or may be stored at a remote location.

SQL database extension agent 82 receives the data from event queue thread 74, statistics gathering thread 76, and configuration procedure 66 and stores the data in an SQL database, which also could be stored on the disk drive 36 of monitoring computer 14 or at a remote location. Storing the data in an SQL database allows further processing by any open database connectivity (ODBC) compliant database software.

Console extension agent 84 processes the data obtained from event queue thread 74, statistics gathering thread 76, and configuration procedure 66 and forwards some or all of that data to a network monitoring console. In this embodiment, console extension 84 forwards events and alerts to an enterprise console such as that available from Tivoli. The enterprise console comprises an event correlator that takes events from network management systems and combines them in a common format. Console extension agent 84 queues events before sending them to the enterprise console. The events may be sent to the enterprise console over computer network 10 using communications link 42 of monitoring computer 14. Alternatively, communications link 42 may have a direct connection to the monitoring console. Console extension agent 84 may also send all events to multiple monitoring consoles. The events may be filtered by console extension agent 84 such that only the most important events are forwarded to the enterprise console. Any type of monitoring console could be used without departing from the scope of the invention.

In this embodiment, event queue file 72 comprises a single queue. Event queue thread 74, statistics gathering thread 76, and configuration procedure 66 seek to send data to the various listener extensions at a constant rate. Sometimes, one of these threads may have to wait for an extension as the various extensions may process data at different rates. Each listener extension 20 may maintain its own queue of data to compensate for a variance in processing speed.

Figure 5:
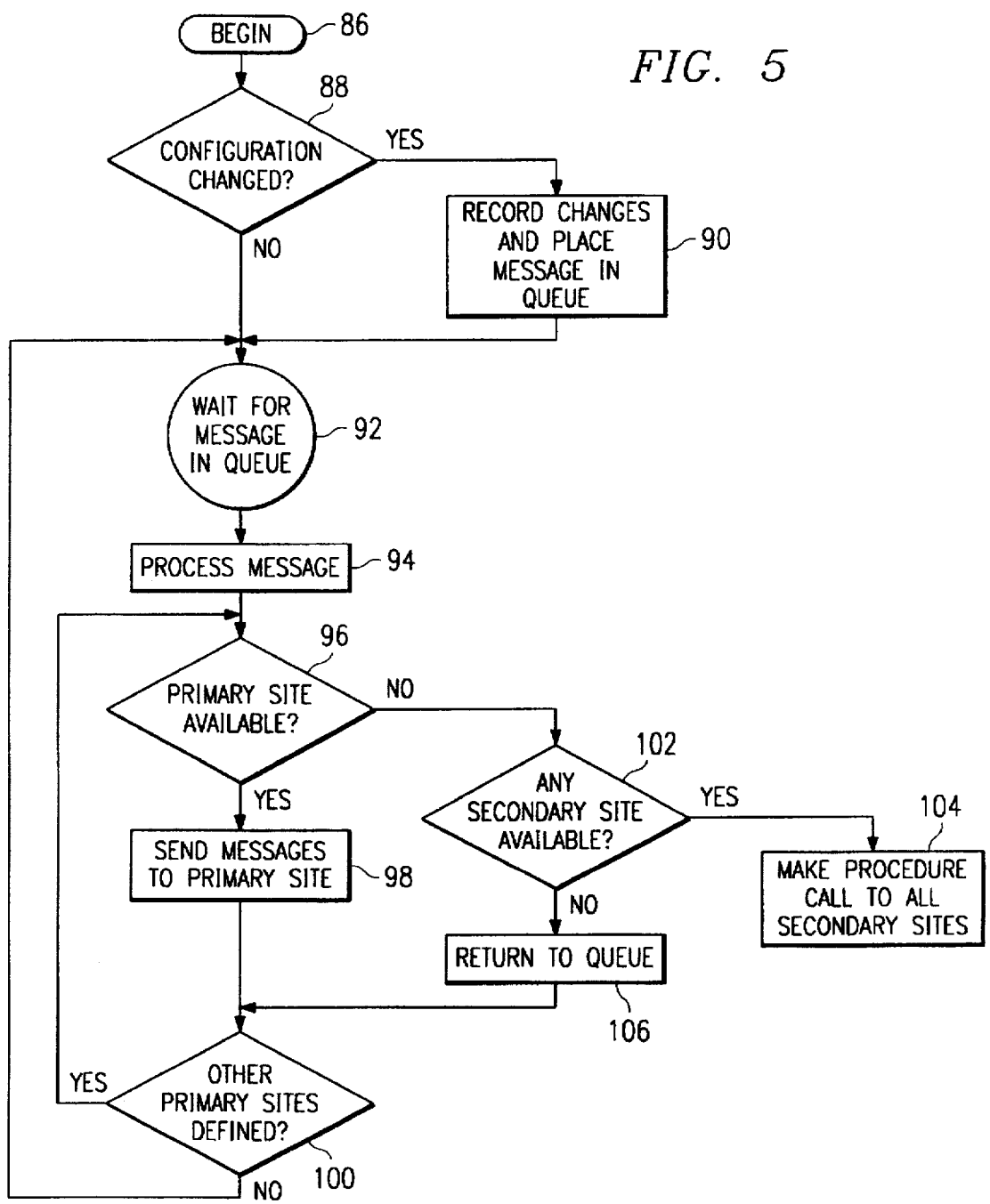
FIG. 5 illustrates a flow chart of the operation of the monitoring and tracking agent of FIG. 3.

FIG. 5 illustrates a flow chart of the general operation of monitoring and tracking agent 16. The process begins in step 86 with initialization. In step 88, configuration procedure 44 determines whether the configuration of the monitored computer 12 has changed. If so, then the changes are recorded in step 90 and a message is placed in configuration changes queue 45. Following step 88, if the configuration was not changed, or following step 90 if the configuration was changed, the procedure continues at step 92 where event transport thread 54 waits for messages to appear in event queue 52. When a message appears in event queue 52, event transport thread 54 processes the message in step 94.

Following the initial processing of the message from event queue 52, event transport thread 54 accesses connection list 60 in step 96 to determine whether a primary site is available or not. If so, then the proper message is sent to the monitoring and tracking listener 18 of that primary site in step 98. Event transport thread 54 generates the proper remote procedure call to the monitoring and tracking listener 18 and sends the data as described above. Then, in step 100, it is determined whether there are other primary sites defined. If so, then the process continues in step 96. If not, then the process continues in step 92, where event transport thread 54 waits for another message to appear in the queue.

If a primary site was not available in step 96, then in step 102 it is determined whether a secondary site is available. Event transport thread 54 determines whether a secondary site is available by accessing connection list 60. If no secondary site is available, then the message is returned to the queue in step 106 with a notation that the message could not be sent to the particular primary and secondary sites. The process then continues in step 100.

If any defined secondary site was available in step 102, then the procedure continues in step 104. Event transport thread 54 makes the appropriate remote procedure calls to all available secondary sites for the primary site that was not available in step 96. In this embodiment, only one secondary site need be available to avoid returning a message to the queue. Thus, in step 104, event transport thread 54 makes the appropriate remote procedure calls to all available secondary sites for the unavailable primary site. Following step 104 the process continues in step 100 where it is determined whether any other primary sites are defined.

Figure 6:
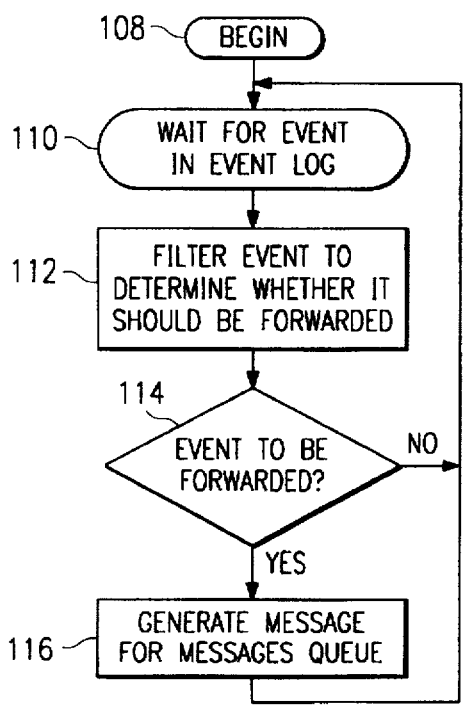
FIG. 6 illustrates a flow chart of the operation of the event capture thread of the monitoring and tracking agent of FIG. 3.

FIG. 6 illustrates a flow chart describing the operation of an embodiment of log capture thread 46. The process begins in step 108 with initialization of log capture thread 46. In step 110, log capture thread 46 waits for an event to appear in the event log of operating system 64. When an event is received, the process continues in step 112. Log capture thread 46 filters the event to determine whether it should be forwarded or not. In step 114, it is determined whether the event should be forwarded or not to monitoring and tracking listener 18. If not, then the process continues in step 110 with log capture thread 46 waiting for another event. If the event is to be forwarded, then in step 116 an appropriate message is generated and placed in event queue 52. Log capture thread 46 continues this process until monitoring and tracking agent 16's execution is terminated.

Figure 7:
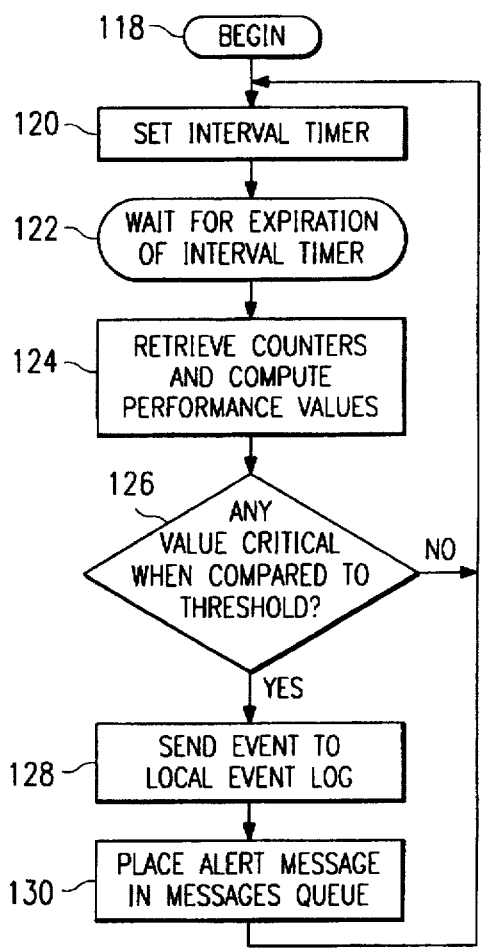
FIG. 7 illustrates a flow chart of the operation of the alert thread of the monitoring and tracking agent of FIG. 3.

FIG. 7 illustrates a flow chart describing the operation of one embodiment of alert thread 48. The process begins at step 118 with initialization of alert thread 48. In step 120, an interval timer is set to a predefined interval defined by the user of monitoring and tracking agent 16. Then, in step 122, alert thread 48 waits for the expiration of the interval timer. When the interval timer expires, alert thread 48 retrieves performance counters maintained by operating system 64 and computes performance values based upon those performance counters. In step 126, alert thread 48 determines whether any performance value has reached an alertable point when compared to a predetermined threshold. If not, then the process continues in step 120 with the interval timer being reset. If a value has reached an alertable level, then in step 128 alert thread 48 generates an alert event and sends it to the local event log maintained by operating system 64. Then, in step 130, alert thread 48 generates an appropriate message regarding the alert and places it in event queue 52. To avoid sending alerts out twice, log capture thread 46 automatically filters out any alert events that were placed in the local event log of operating system 64.

Figure 8:
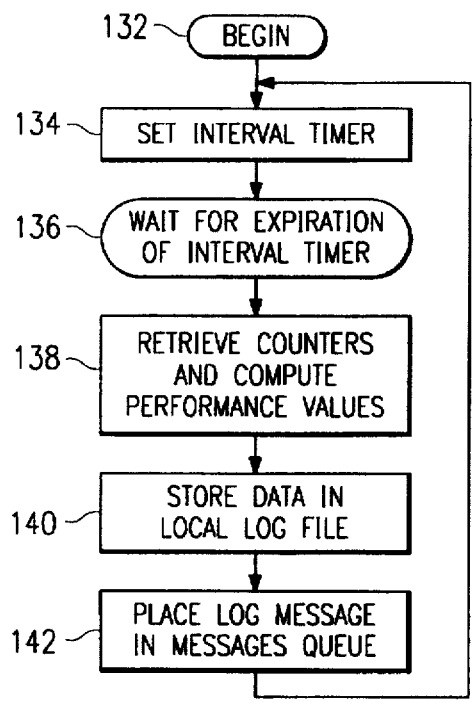
FIG. 8 illustrates a flow chart of the operation of the logging thread of the monitoring and tracking agent of FIG. 3.

FIG. 8 illustrates a flow chart of the operation of an embodiment of logging thread 50. The process begins at step 132 with initialization of logging thread 50. In step 134, logging thread 50 sets an interval timer to a predetermined interval as defined by the user of monitoring and tracking agent 16. This interval may or may not be the same interval used by alert thread 48. Next, in step 136, logging thread 50 waits for the expiration of the interval timer. When the interval timer expires, logging thread 50 retrieves performance counters from operating system 64 and computes performance values based upon those performance counters in step 138. Then, in step 140, the performance values that were computed and any performance counters that the user of monitoring and tracking agent 16 is configured to record are stored in a local log file in step 142. Next, in step 142, a message that the data has been logged along with date and time stamp information is sent to the connection list 60 by performance data procedure 58. If a previous date and time stamp remains in connection list 60, then, in this embodiment, the previous date and time stamp remains unchanged and the listener is not notified a second time. Alternatively, the listener could be notified multiple times. If no previous date and time stamp is present, then the listener is notified that performance data is available by connection manager thread 62. The process then repeats itself by resetting the interval timer in step 134.

Figure 9:
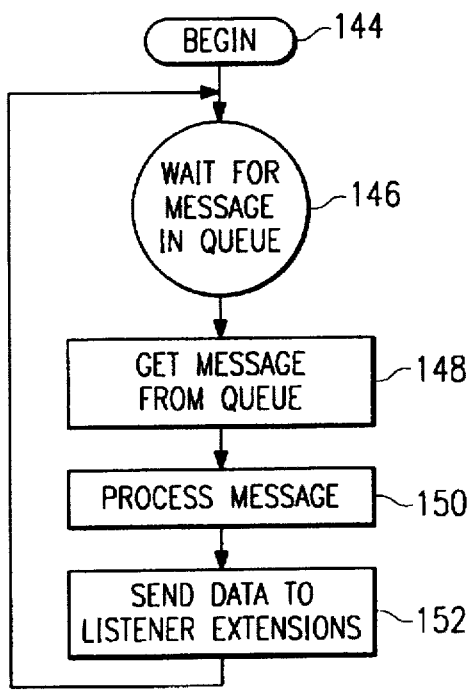
FIG. 9 illustrates a flow chart of the operation of the monitoring and tracking listener application of FIG. 4.

FIG. 9 illustrates a flow chart generally describing the operation of an embodiment of monitoring and tracking listener 18. The process begins in step 144 with initialization. Then, in step 146, event queue thread 74 waits for a message to appear in event queue file 72. The messages placed in event queue file 72 are generated by event procedure 68. When a message appears, the process continues in step 148 as event queue thread 74 retrieves the message from event queue file 72. In step 150, event queue thread 74 processes the message as necessary. Then, in step 152, event queue thread 74 sends the data to the listener extensions 20. In this embodiment, event queue thread 74 sends the data to ASCII extension agent 80, SQL database extension agent 82, and console extension agent 84. Event queue thread 74 may maintain a queue of data to be sent to the listener extensions 20. Event queue thread 74 may maintain a separate queue for each listener extension 20 or a single queue for all listener extensions 20. After the data for a message has been sent to the proper listener extension, the process continues in step 146 where event queue thread 74 waits for another message to appear in event queue file 72. The process continues in this manner until the execution of monitoring and tracking listener 18 is terminated.

Figure 10:
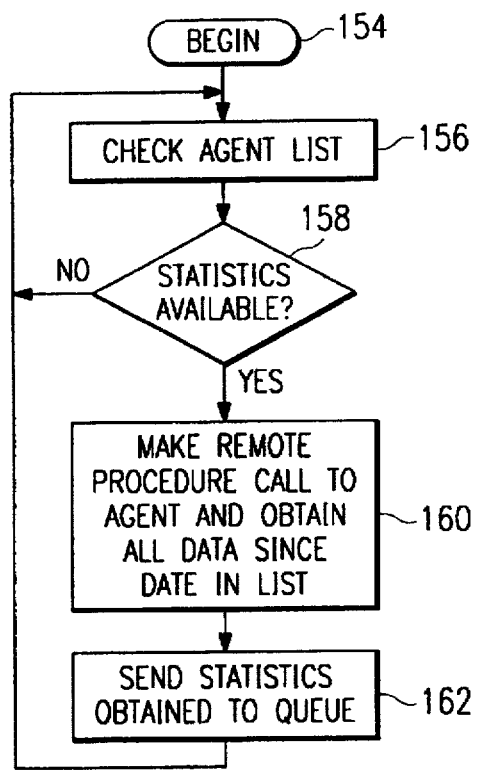
FIG. 10 illustrates a flow chart of the operation of the statistics gathering thread of the monitoring and tracking listener application of FIG. 4.

FIG. 10 illustrates a flow chart describing the operation of an embodiment of statistics gathering thread 76. Statistics gathering thread 76 monitors agent list 78 and, in this example, performs the process illustrated in FIG. 10 only when monitoring and tracking listener 18 does not have configuration data, events, or alerts to process. The process begins at step 154 with initialization of statistics gathering thread 76. In step 156, statistics gathering thread 76 accesses agent list 78 to determine whether any statistics are available from any monitoring and tracking agent 16. In step 158, statistics gathering thread 76 determines if such statistics are available. If not, then statistics gathering thread 76 continues to monitor agent list 78 in step 156. When statistics are available, the process continues in step 160 where statistics gathering thread 76 makes a remote procedure call to the appropriate agent and obtains all performance statistics that the monitoring and tracking agent 16 has recorded since the date and time entry for that agent in agent list 78. After obtaining this data, the statistics that were obtained from the remote procedure call are packaged into a message and sent to the listener extensions 20 in step 162. These messages may be queued by the listener extensions 20. The process then continues in step 156.

The processes illustrated in FIGS. 5–10 are only examples illustrating the operation of monitoring and tracking agent 16 and monitoring and tracking listener 18. Other processes could be used without departing from the scope of the invention. The functions of monitoring and tracking 16 and monitoring and tracking listener 18 could also be performed by a computer software program having a different structure than the embodiments illustrated in FIGS. 3 and 4. Various steps could also be omitted or additional steps added to the processes illustrated in FIGS. 5 through 10.

Although the present invention has been described in detail, it should be understood that various changes, substitutions, and alterations can be made hereto without departing from the spirit and scope of the invention as defined by the appended claims.

What is claimed is:

1. A method for monitoring the performance of a first computer coupled to a computer network, comprising:

repeatedly obtaining performance data comprising at least one performance value using the first computer, the performance value comprising a measure of the performance of the first computer;

automatically sending the performance data from the first computer over the computer network to a second computer coupled to the computer network;

receiving the performance data at the second computer; and passing the performance data to a first extension agent, the first extension agent operable to process the performance data.

2. The method of claim 1 wherein the first extension agent comprises a dynamic link library procedure running on the second computer.

3. The method of claim 1 wherein the first extension agent is further operable to send the processed performance data to a database.

4. The method of claim 1 wherein the first extension agent is further operable to send the processed performance data to a central monitoring console.

5. The method of claim 1, further comprising:

queueing the performance data received by the second computer; and wherein the passing step further comprises passing the queued performance data to the first extension agent when the first extension agent is ready to receive the performance data.

6. The method of claim 1, further comprising:

passing the performance data to a second extension agent, the second extension agent operable to process the performance data.

7. The method of claim 6, further comprising:

queueing the performance data received by the second computer to a first queue and a second queue;

wherein the step of passing the performance data to the first extension agent further comprises passing the queued performance data in the first queue to the first extension agent when the first extension agent is ready to receive the performance data; and wherein the step of passing the performance data to the second extension agent further comprises passing the queued performance data in the second queue to the second extension agent when the second extension agent is ready to receive the performance data.

8. A system for monitoring the performance of a first computer coupled to a computer network, comprising:

a first computer;

a second computer;

a computer network connecting the first and second computer;

a tracking program running on the first computer and operable to repeatedly obtain performance data comprising at least one performance value, the performance value comprising a measure of the performance of the first computer, the tracking program further operable to automatically send the performance data from the first computer over the computer network to the second computer; and a dispatching program running on the second computer, the dispatching program operable to receive the performance data and pass the performance data to a first extension agent, the first extension agent operable to process the performance data.

9. The system of claim 8, wherein the first extension agent comprises a dynamic link library procedure running on the second computer.

10. The system of claim 8, wherein the first extension agent is further operable to send the processed performance data to a database.

11. The system of claim 8, wherein the first extension agent is further operable to send the processed performance data to a central monitoring console.

12. The system of claim 11, wherein the first extension agent is further operable to queue events contained in the processed performance data to a central monitoring console.

13. The system of claim 8, wherein the tracking program is further operable to obtain configuration data comprising information about the configuration of the first computer and automatically send the configuration data over the computer network to the second computer.

14. The system of claim 8, wherein the tracking program is further operable to generate an alert indicating that the performance of the first computer has reached a critical level and automatically send the alert over the computer network to the second computer.

15. The system of claim 8, wherein the tracking program is further operable to monitor events that occur in the first computer and are recorded by an operating system controlling the first computer, the tracking program further operable to send the events over the computer network to the second computer.

16. The system of claim 8, wherein the dispatching program is further operable to queue the performance data received by the second computer and pass the queued performance data to the first extension agent when the first extension agent is ready to receive the performance data.

17. The system of claim 8, wherein the dispatching program is further operable to pass the performance data to a second extension agent running on the second computer, the second extension agent operable to process the performance data.

18. The system of claim 17, wherein the dispatching program is further operable to queue the performance data received by the second computer to a first queue and a second queue, pass the queued performance data in the first queue to the first extension agent when the first extension agent is ready to receive the performance data, and pass the queued performance data in the second queue to the second extension agent when the second extension agent is ready to receive the performance data.

19. A program for monitoring the performance of a first computer coupled to a computer network, comprising:

a computer readable storage medium;

a dispatching program stored on the storage medium, the dispatching program operable to receive performance data sent over the computer network by the first computer, the performance data repeatedly obtained by the first computer and comprising a measure of the performance of the first computer, the dispatching program further operable to pass the performance data to a first extension agent, the first extension agent operable to process the performance data.

20. The program of claim 19, wherein the dispatching program is further operable to queue the performance data received by the second computer and pass the queued performance data to the first extension agent when the first extension agent is ready to receive the performance data.

* * * * *